March 5, 1963 H. B. GUSTAFSON 3,080,218
RESIDUAL DETECTOR

Filed Aug. 20, 1956 3 Sheets-Sheet 1

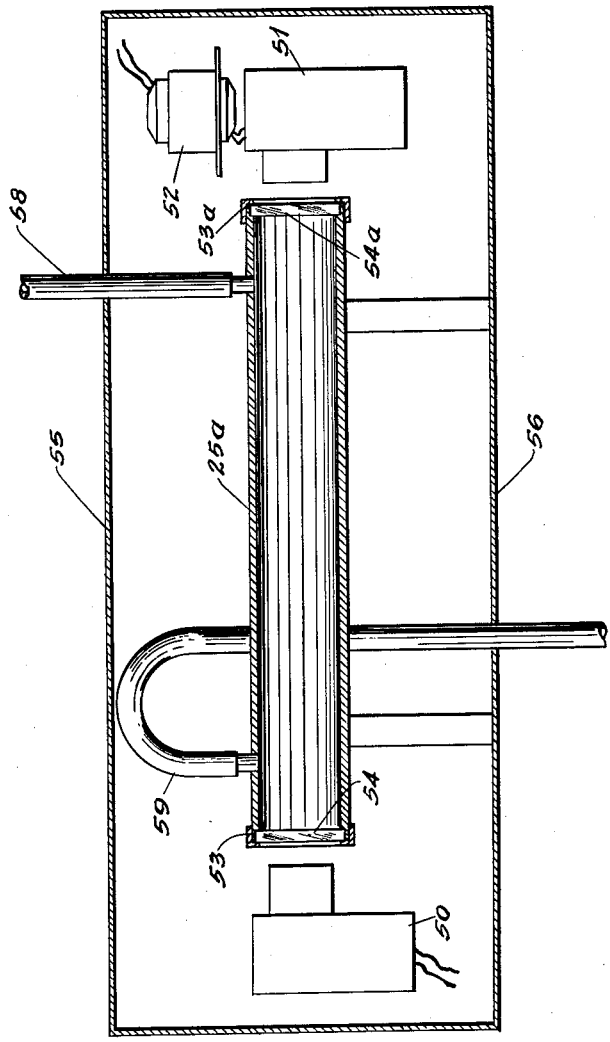

United States Patent Office 3,080,218
Patented Mar. 5, 1963

3,080,218
RESIDUAL DETECTOR
Hilding B. Gustafson, Tucson, Ariz., assignor to Infilco Incorporated, Tucson, Ariz., a corporation of Delaware
Filed Aug. 20, 1956, Ser. No. 604,951
5 Claims. (Cl. 23—253)

This invention relates to a device for detecting the presence of certain chemicals in liquids. More specifically, the device serves to indicate visually on the one hand whether a liquid is free of a specific chemical; on the other hand to ascertain whether a specific chemical is present in a liquid in predetermined amount. Chemicals which can be detected by the new device are chlorine, hardness forming compounds, silica, iron and other materials which lend themselves to a colorimetric test.

It is an object of this invention to provide a device by which the presence of an undesirable chemical in liquid can be readily ascertained.

Another object is to provide a device which permits a ready check whether a liquid contains a desired quantity of a chemical.

Another object is to provide a chlorine detector which indicates whether a liquid is free of chlorine and also can be used to indicate whether a predetermined chlorine residual is maintained in a liquid.

Another object is to provide a device which will indicate readily the presence of hardness in a liquid and will permit an approximate estimate of its quantity.

Another object is to provide a device which will indicate readily the presence of silica or of iron and will permit to approximately estimate their quantity.

Another object is to provide a device which detects automatically the presence of an undesirable chemical or the absence of a predetermined amount of a desired chemical.

Other objects will become apparent upon consideration of the detailed description and the claims which follow.

In many cases, it is necessary to ascertain the presence or absence in a liquid of certain chemicals, or the maintenance of a residual of desired magnitude. Thus, when a water is prepared for bottling soft drinks, it is imperative that no trace of chlorine be left in the water, as even very small amounts of chlorine such as .05 p.p.m. (part per million) impart an off-taste to the finished beverage. In spite of treatment with dechlorinating chemicals, such as activated carbon, it happens that small quantities of chlorine leak into the finally treated water. If not promptly detected, the use of such water will cause serious losses to the bottler.

On the other hand, in producing a safe drinking or bathing water from contaminated surface waters, a chlorine residual of 0.3 p.p.m. is considered a desirable safeguard. The residual, however, should not be in excess of that found proper to avoid unpleasant taste of the drinking water or skin and eye irritations of bathers. Similarly, when sewage is discharged to a stream which does not afford sufficient dilution, it is typically chlorinated to a residual of 0.2 p.p.m. to protect the aquatic life in the stream and the downstream users of the water.

Presence of chlorine can be ascertained by the well known o-tolidine test which produces a yellow color in water containing chlorine. It is highly desirable that such tests be made at regular intervals. To collect samples and make the tests at the proper times requires, however, often more personnel than available. I, therefore, propose to provide means for sampling and testing the water automatically, at regular intervals and at a location where the result of the test can be readily observed by personnel engaged in other work around the plant without interrupting their work.

In my detector a sample of the liquid to be tested is automatically taken during a predetermined portion of a sampling cycle, such as during 30 seconds out of each hour. The sample is automatically dosed with a predetermined quantity of indicator solution, in the case of chlorine detection o-tolidine solution, and the mixture introduced into a transparent detector cell which is arranged between a pair of color comparison standard cells. This arrangement facilitates detection of even a faint change in color, such as a faint yellow coloration developed in the o-tolidine dosed water. When the water should be free of chlorine, as when preparing a water for bottling, one of the color comparison cells will be filled with color free water, the other with a color standard corresponding to the color developed by a predetermined chlorine content in water undergoing o-tolidine test. In this case the color free water provides the standard. When a predetermined chlorine residual is desired, the two color comparison standards will be given colors which are, respectively, immediately above and below the color which the o-tolidine dosed water under test should assume. While a qualitative color determination can be made without color standard, merely by observing the color of the liquid in the detector cell, by providing a color standard, and preferably also a second color comparison which has a known relation to the standard, the actual color comparison is facilitated and an approximate quantitative determination of the deviation from the standard made possible.

The device can also be used for detecting other chemicals which can be subjected to colorimetric tests. For example, the effluent of a softener can be tested in my detector for residual hardness, using the well known Eriochrome Black T test. Any change in the color of the dosed effluent from blue to red indicates hardness and by using proper color comparison standards the degree of hardness can be roughly estimated. Similarly, the presence of iron can be detected by subjecting the water to a potassium thiocyanate test, any change of the color of the water from colorless to red indicating the presence of iron. The presence of silica is indicated when a water turns from colorless to yellow upon addition of an acid solution of ammonium molybdate. All these tests, which are in and of themselves well known in the art, can be carried out automatically in my detector, leaving to the operator only the task of determining, at a glance, the color of the tested water.

The detector may also be equipped with means for automatically evaluating the results of the tests. In such case, the test cell is interposed between a source of light of constant strength and a photoelectric cell, which actuates an indicator or an alarm when the light transparency of a liquid sample, due to development of color in the test, differs from a set standard. Alternatively, the photoelectric cell may bring suitable means into play to correct the discrepancy or stop the plant operation.

The invention will be more readily understood by reference to the drawings which form a part hereof and wherein:

FIGURE 5 is a diagrammatic cross-sectional view of means for automatically evaluating the results of the tests carried out by the detector.

Figure 1:
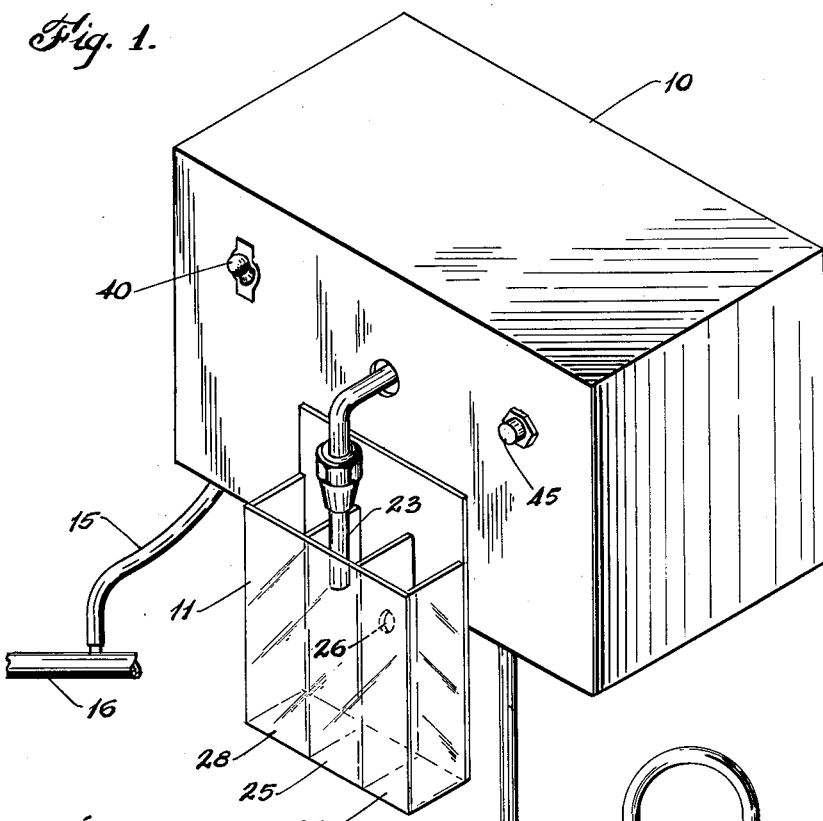
FIGURE 1 is an isometric view of the detector device.

As shown in FIGURE 1, the detector device comprises an operating cabinet 10 to the front of which a transparent 3-cell casing 11 is attached. A sample of the liquid to be tested enters the cabinet 10 through a sample line 15 which is branched off the main line 16 of the liquid to be tested. Indicator solution enters through flexible plastic tubing 18 connected to a suitable container for the solution, such as bottle 19, or, if several solutions are needed for the test, to a plurality of such containers.

A solenoid operated valve 20 is installed in the sample line 15 within the cabinet 10. On the portion of the sample line downstream of the valve 20 an ejector 22 is provided into which the indicator solution tubing 18 is connected. The outlet of the ejector is connected, as by an L, to a spout 23 which discharges into the center or detector cell 25. An overflow 26 leads from the center cell 25 and may discharge to a drain, not shown. Color comparison standard cells 28 and 29 are filled with suitable color comparison standards, such as colorless water and a standard corresponding to the color of water with a known chlorine content, respectively.

Figure 4:
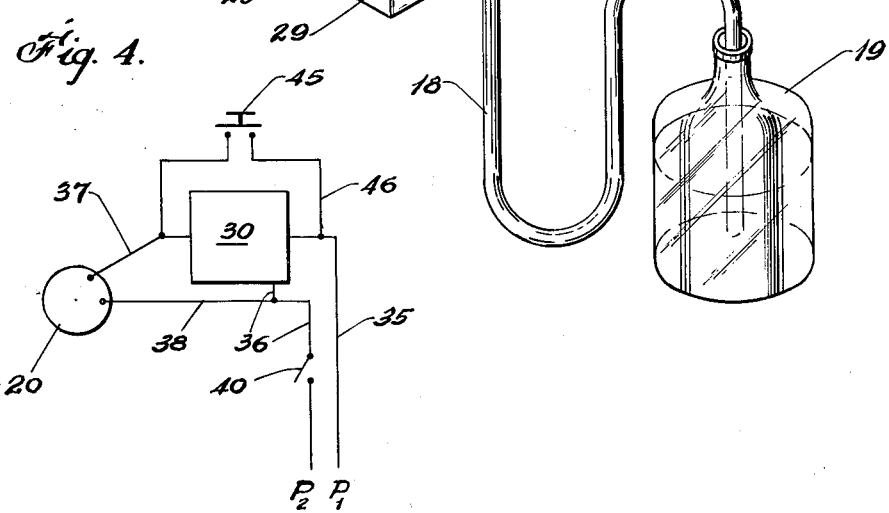
FIGURE 4 is a diagrammatic wiring diagram of the detector.
Figure 2:
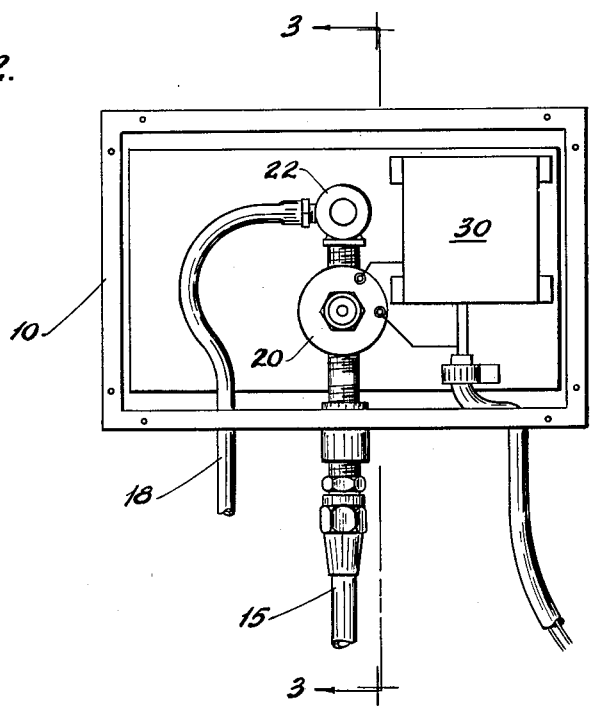
FIGURE 2 is a front view of the operating cabinet of the device with the front wall removed.
Figure 3:
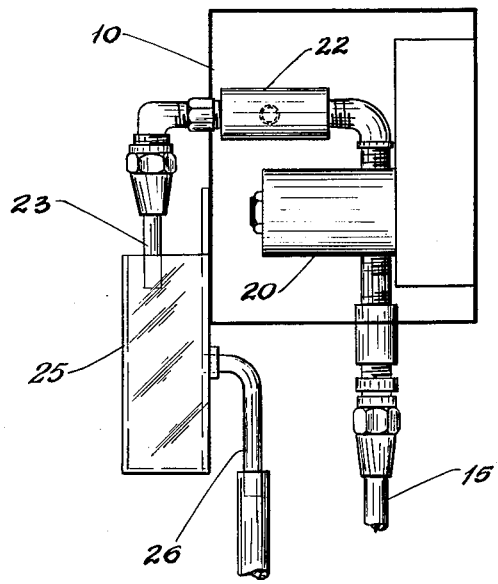
FIGURE 3 is a vertical sectional view along line 3—3 of FIGURE 2.

Timing means 30 are provided to control the operation of the solenoid valve. As best shown in FIGURE 4, the timing means 30 are connected to a source of power $P_1P_2$ through conductors 35 and 36, and to the solenoid of valve 20 through a conductor 37. A conductor 38 connects the solenoid of valve 20 to conductor 36. A manually operated off-on switch 40, installed on the front cover of the cabinet, may be connected in conductor 35, or, as shown in FIGURE 4, in conductor 36. Switch 40 is closed to start operation of the detector and remains closed until operation is to be stopped. With the switch 40 closed, when the timer 30 closes the circuit through the solenoid of valve 20, the valve opens for the period of time for which the timer is set, and closes thereafter as the timer breaks this circuit, and remains closed until the timer again closes the circuit through the solenoid.

In the operation of the timer described above, the use of a normally closed solenoid valve is contemplated. However, a normally open solenoid valve could be used instead and the timer be set to close the circuit through the solenoid for the main portion of the sampling circuit and break it for the short period in which the sampling takes place.

A pushbutton switch 45, also installed on the front cover of the cabinet 10, is connected to a conductor 46 which leads from conductor 35 to conductor 37. By pressing the button of normally open switch 45 while the circuit through the timer 30 is open, a circuit from $P_1$ through conductors 35, 46 and 37, the solenoid of valve 20 and conductors 38 and 36 to $P_2$ is established. This circuit remains closed as long as the switch 45 is held closed.

In operation of the device, say for detecting traces of chlorine in water, the timer is set to open the solenoid valve for 30 seconds each hour. The main line 16 for the water to be tested must be under sufficient pressure that, upon opening of valve 20, the water flows with high velocity through line 15, valve 20, ejector 22 and spout 23 into the sample cell 25, flushing out the sample line 15 and cell 25 through the overflow 26. A pressure within the range of from 10 to 20 lbs. gauge pressure has been found adequate. As the water flows through the ejector 22, o-tolidine solution of predetermined strength from container 19 is ejected into, and mixed with, the water. When the solenoid valve 20 closes at the end of the sampling period for which the timer is set (in the above example 30 seconds), a fresh sample of water dosed with o-tolidine solution remains in the cell. If a yellow color develops the water contains chlorine. Thus, instead of manually taking samples of the liquid every hour and making o-tolidine tests on the samples, all the plant operator has to do in order to promptly ascertain the presence of chlorine in the water is to glance occasionally at the center cell and compare the color of the liquid therein with the color standards of the comparison cells.

Between the regular test periods for which the timer is set, samples can be taken and tested at any time by manually closing the switch 45 and holding it closed for the length of a sampling period (i.e. 30 seconds in the example above). Thus, should there be any reason to suspect a leak of chlorine between regular sampling periods, it is not necessary to wait for the next automatic test, but a check can be made at any time.

In addition to the means for automatic sampling and testing so far described, the detector can also be equipped with means for automatically evaluating the result of a test and for actuating an alarm, or correcting or stopping the operation of the plant, in case the result of the test varies from the predetermined standard. As shown diagrammatically for purposes of illustration in FIGURE 5, the automatic evaluating means may take the form of a photoelectric cell 50 which receives light from a source of light of constant strength 51, such as an electric light bulb, connected to a network, not shown, by means of a transformer 52. Interposed between the photoelectric cell 50 and the light source 51, is a detector cell 25a in the form of a tube which is closed at both ends by caps 53 and 53a, respectively. Each end cap has a transparent window, 54 and 54a, respectively, aligned with the beam of the light source and the photoelectric cell. The elements 50, 51 and 25a are enclosed in a casing 55 and supported from its bottom plate 56, as shown. The casing 55 can be mounted on the front wall of the cabinet 10 or independently thereof. The sample line 15 downstream of the ejector 22 has an extension 58 which may enter the casing 55 through its top and discharge into one end portion of the tube 25a. An outlet line 59 leads from the top of the other end portion of the tube 25a and through the bottom of casing 55 to a drain, not shown. The photoelectric cell 50 may be connected through an amplifier, not shown, to a relay or other electrical means which actuates an alarm, or corrects or stops operation of the plant. Such means are well known in the art and need, therefore, not be shown or described herein.

When the timer 30 opens the solenoid valve 20, sample liquid mixed with indicator solution enters the test cell 25a through line 58, flushing out through outlet line 59 any air trapped in cell 25a and the liquid left therein from the previous testing cycle, and filling the cell 25a with a fresh o-tolidine dosed sample. If the intensity of the light received by the photoelectric cell through this sample deviates from the standard for which the photoelectric cell is set, due to the color of the liquid changing from colorless to yellow, the output of the photoelectric cell changes accordingly and the actuating means to which it is connected will sound an alarm or stop the operation of the plant. When a residual of predetermined value is to be maintained in the liquid under test, such as in chlorinating water or wastes to a specific residual, the photoelectric cell can be connected to a device controlling the chlorinator output to increase or decrease, as the case may be, the quantity of chlorine added to the liquid from which the sample is taken, until the color developed in the o-tolidine dosed sample is such as to pass light of an intensity corresponding to the standard for which the photoelectric cell is set.

It will be obvious that residuals of other chemicals which permit colorimetric tests, such as hardness forming compounds, iron, etc., can be automatically detected and if desired, automatically evaluated in analogous manner. Various modifications can be made without departing from the spirit and scope of the invention. Thus, the ejector need not be downstream of the solenoid valve, but can be on the sample line upstream thereof. In such case the tubing from the indicator solution must be provided with a valve. The timer motor need not be driven by power from the circuit $P_1$—$P_2$, but can be driven from another source of power. Accordingly, I do not wish to limit myself to the exact details of the embodiments of the invention shown for purposes of illustration and exemplification.

I claim:

1. A device for automatically sampling, and testing a chemical characteristic of, a liquid, said device consisting of a sampling conduit connected to a source of liquid to be treated, a solenoid operated valve on said conduit, a power circuit through the solenoid of said valve, a test cell, said sampling conduit discharging a sample to said test cell when said valve is open, an ejector on said sampling conduit, an indicator solution line leading from a source of indicator solution to said ejector, whereby, when said valve is open, indicator solution is mixed in said sampling conduit with liquid to be tested and the sample discharged into said test cell is a mixture of liquid to be tested and indicator solution, an overflow from said test cell, means providing a predetermined standard for evaluation of the color of the mixture of liquid to be tested and indicator solution in said test cell, said standard being independent of changes in the chemical characteristic of said liquid, and a timer closing said circuit during a predetermined portion of each sampling cycle and breaking it during the balance of said cycle to open said solenoid valve for a small part of the cycle just sufficient to displace the previous sample from said test cell by a new sample, and to hold the valve closed during the major part of the cycle, whereby each sample is retained in said test cell until it is displaced by a new sample.

2. A device according to claim 1 including also a second circuit through said solenoid, and a normally open pushbutton switch connected in said circuit.

3. The device of claim 1, wherein said means providing a predetermined standard provide a color standard for visual comparison of the color of the liquid dosed with indicator solution in the test cell with said color standard.

4. The device of claim 1, wherein said test cell is transparent, and said means providing a predetermined standard comprise at least one color comparison standard cell adjacent said test cell, said standard cell being filled with a color comparison standard which is independent of said liquid.

5. In a device for automatically sampling, and testing a chemical characteristic of, a liquid, wherein a test cell having an overflow and adapted to hold a sample of liquid dosed with indicator solution is interposed between a source of light of constant intensity and photoelectric means receiving the light from said source, the output of said photoelectric means varying in response to variations in the intensity of the light received by it due to deviations in the color of the liquid in said test cell from a predetermined standard, improved means for taking a sample dosed with indicator solution and introducing it into said test cell, said means consisting of a sampling conduit connected to a source of liquid to be tested, a solenoid operated valve on said conduit, a power circuit through the solenoid of said valve, an ejector in said sampling conduit downstream of said valve, an indicator solution line leading from a source of indicator solution to said ejector, said sampling conduit discharging to said test cell a mixture of liquid to be tested and indicator solution, and a timer connected in said circuit and closing said circuit during a predetermined portion of each sampling cycle and breaking it during the balance of each sampling cycle to hold said valve open for a small portion of the sampling cycle just sufficient to displace from said test cell the previous sample by a new sample, and to close said valve for the major portion of said cycle so that each sample is retained in said test cell until it is displaced by a new sample.

References Cited in the file of this patent

UNITED STATES PATENTS

| 1,266,315 | Raddant | May 4, 1918 |
|-----------|---------|-------------|
| 2,102,282 | Roy | Dec. 14, 1937 |
| 2,161,453 | Busby et al. | June 6, 1939 |
| 2,241,121 | Daniels | May 6, 1941 |
| 2,253,049 | Richie | Aug. 19, 1941 |
| 2,422,498 | Perlman | June 17, 1947 |
| 2,656,845 | Lindsay | Oct. 27, 1953 |
| 2,672,405 | Sheen | Mar. 16, 1954 |